United States Patent
Blessing et al.

(10) Patent No.: US 7,225,791 B2
(45) Date of Patent: Jun. 5, 2007

(54) COMPRESSION-IGNITION INTERNAL COMBUSTION ENGINE

(75) Inventors: Matthias Blessing, Berglen (DE); Harald Braun, Esslingen (DE); Frank Keller, Ostfildern (DE); Gerhard Koenig, Lauterstein (DE); Christian Krueger, Stuttgart (DE); Alois Raab, Boebingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/563,332

(22) PCT Filed: Jun. 25, 2004

(86) PCT No.: PCT/EP2004/006879

§ 371 (c)(1),
(2), (4) Date: Jun. 8, 2006

(87) PCT Pub. No.: WO2005/001255
PCT Pub. Date: Jan. 6, 2005

(65) Prior Publication Data
US 2006/0243242 A1 Nov. 2, 2006

(30) Foreign Application Priority Data
Jun. 30, 2003 (DE) ............................... 103 29 524

(51) Int. Cl.
*F02B 3/00* (2006.01)
*F02B 13/02* (2006.01)
(52) U.S. Cl. ..................... 123/299; 123/305
(58) Field of Classification Search .......... 123/299, 123/300, 301, 305, 295, 307, 430, 276; 239/533.2, 239/533.3, 533.7, 533.8, 533.9, 88, 91
See application file for complete search history.

(56) References Cited

U.S. PATENT DOCUMENTS

| | | | |
|---|---|---|---|
| 5,163,621 A | 11/1992 | Kato et al. | |
| 6,513,487 B1 | 2/2003 | Jorach et al. | |
| 6,725,838 B2 * | 4/2004 | Shafer et al. | 123/446 |
| 2002/0083920 A1 * | 7/2002 | Konig et al. | 123/299 |
| 2003/0066509 A1 * | 4/2003 | Shafer et al. | 123/305 |
| 2003/0094517 A1 | 5/2003 | Kato et al. | |
| 2003/0102390 A1 | 6/2003 | Clarke et al. | |
| 2004/0237929 A1 * | 12/2004 | Cavanagh et al. | 123/299 |
| 2005/0224605 A1 * | 10/2005 | Dingle | 239/533.2 |

FOREIGN PATENT DOCUMENTS

| | | |
|---|---|---|
| DE | 42 10 563 A | 10/1992 |
| DE | 199 53 932 A | 5/2001 |
| EP | 1 217 186 A | 6/2002 |
| EP | 1 321 662 A | 6/2003 |
| JP | 8-254123 | 10/1996 |
| WO | WO 02/18775 A | 5/2002 |
| WO | WO 03/052259 A | 6/2003 |

\* cited by examiner

*Primary Examiner*—Mahmoud Gimie
(74) *Attorney, Agent, or Firm*—Crowell & Moring LLP (57) ABSTRACT

The invention relates to an internal combustion engine with a fuel injection device with an injection nozzle having a nozzle needle and a plurality of injection bores. The injection nozzle is arranged to inject fuel into the combustion space in the form of a plurality of fuel jets as a main injection, as a post-injection and/or a preinjection. The injection bores of the injection nozzle are arranged in at least two different separately activatable rows of holes, an operating stroke of the nozzle needle being set by control unit as a function of a piston position and/or an operating point of the engine, and the rows of holes of the injection nozzle different injection-hole cone angles.

12 Claims, 5 Drawing Sheets

COMPRESSION-IGNITION INTERNAL COMBUSTION ENGINE

CROSS-REFERENCE TO RELATED APPLICATIONS

This is a U.S. National Phase of International Application No. PCT/DE02/04205, filed Jun. 25, 2004, and claims the benefit of priority under 35 U.S.C. §119 based on DE 10329524.0, filed Jun. 30, 2003, the entire disclosures of which are incorporated herein by reference.

BACKGROUND AND SUMMARY OF THE INVENTION

The invention relates to a compression-ignition internal combustion engine, in which fuel is injected into a combustion space by an injection nozzle having a plurality of injection bores.

In direct-injection internal combustion engines with compression ignition, for the configuration of a load-dependent fuel injection, injection nozzles are used in which the configuration of the injection profile is controlled by a corresponding construction of the injection nozzle. This is intended to improve mixture preparation in the combustion space and therefore the formation of emissions in the exhaust gas. Furthermore, the functioning of downstream exhaust gas treatment can be optimized.

DE 19953932 A1 discloses a method in which a combined homogeneous/heterogeneous type of operation of an internal combustion engine for the achievement of medium and higher powers is proposed. In this context, both early homogeneous mixture formation in the compression stroke and subsequent heterogeneous mixture formation around top dead center are to become possible by an injection strategy, fuel injection taking place at a lower injection pressure during homogeneous mixture formation than during heterogeneous mixture formation, in order to avoid fuel being applied to the cold combustion space walls. Experience has nevertheless shown that, in spite of the measures proposed above, increased exhaust gas emissions continue to occur. Further measures, by which the exhaust gas emissions are minimized, must therefore be taken.

The object on which the invention is based is to provide an internal combustion engine with compression ignition, by which mixture formation and combustion in the combustion space are improved. This is achieved, according to the invention as follows.

The internal combustion engine according to the invention is distinguished in that fuel is injected, by an injection nozzle having a nozzle needle and possessing a plurality of injection bores, into a combustion space formed between a piston and a cylinder head, in the form of a plurality of fuel jets as a main injection and, if appropriate, as a preinjection and/or postinjection, the injection bores of the injection nozzle being arranged in at least two different separately activatable rows of holes, and an operating stroke of the nozzle needle being capable of being set by the control unit as a function of a piston position ($\phi$) and/or of an operating point of the internal combustion engine (1).

Accordingly, a controlled injection of the fuel for varying the jet length in the combustion space can be carried out as a function of the piston position in the cylinder, with the result that the intermixing of the injected fuel with the combustion space air, particularly during preinjection and postinjection, takes place before the cylinder wall is reached. A wetting of the cylinder wall with fuel can thereby largely be avoided.

According to a refinement of the invention, the rows of holes of the injection nozzle have different injection-hole cone angles. The fuel can thereby, in particular, be introduced into the combustion space at a steeper injection angle during a preinjection or during a postinjection than during the main injection. The jet length in the combustion space can thus be adapted as a function of the distance between the injection nozzle and the piston, so that a variation in the jet length in order to optimize the mixture formation is thereby ensured or made possible.

In a further refinement of the invention, a first row of holes of the injection nozzle is activated during main injection and a second row of holes is activated during preinjection and/or postinjection, the injection-hole cone angle of the first row of holes being higher than the injection-hole cone angle of the second row of holes. In this case, during the main injection, the fuel is injected around a top dead center through the first row of holes at a flat injection-hole cone angle, preferably of between 140° and 160°. By contrast, in the event of early and/or late fuel injection, the fuel is injected into the combustion space at a steep injection cone angle, for example of between 60° and 160°, through the second row of holes arranged preferably below the first row of holes. This makes it possible to have an optimum jet length in the combustion space during an injection operation. According to the invention, depending on the operating point, an injection operation comprises a main injection and, as required, a preinjection and/or postinjection.

According to a further refinement of the invention, a fuel injection pressure can be set as a function of the piston position ($\phi$) and/or of an operating point. As a result, furthermore, the jet length of the fuel introduced into the combustion space can be influenced.

In a further refinement of the invention, an operating stroke of the nozzle needle of the injection nozzle can be set in such a way that an unstable cavitating flow is formed in the injection bores of the injection nozzle. Preferably, during the preinjection and/or postinjection, the fuel is injected intermittently in the form of small part quantities. Accordingly, owing to the variable setting of the operating stroke of the nozzle needle of the injection nozzle, in the case of each preinjection or postinjection part quantity injected into the combustion space, the atomization of the respective fuel jet in the combustion space can be reinforced, so that a wall accretion of fuel in the cylinder, which, for example, rises continuously in the case of a lower gas pressure and lower temperature in the cylinder, is minimized. Thus, according to the invention, the range of each part quantity up to a combustion space wall is limited and an intensified break-up and evaporation of the injection jet or of the part quantity, particularly with an increasingly later start of injection, are achieved.

According to a further refinement of the invention, a swirl movement can be set in the combustion space of the internal combustion engine. Preferably, a generated fuel cloud of a fuel jet (17) is offset or laterally displaced by the swirl movement set in the combustion space, in particular during a fuel injection carried out intermittently. As a result, for example, the formed fuel cloud of a part quantity, when it penetrates through the combustion space, can be laterally displaced, in particular in the direction of a cylinder wall. The fuel jets or the fuel droplets are thus moved away or moved further from the cylinder wall during their propagation, so that they are intermixed with the combustion space air or evaporate, in particular during preinjection and postinjection, before they reach the cylinder wall. A wall accretion of fuel in the cylinder is thus largely prevented. If there is no swirl movement in the combustion space, the fuel jet is propagated along an injection-hole center axis and impinges onto the cylinder wall on account of the short travel up to the cylinder wall. Furthermore, in this case, the preceding jet parcels or the jet parcels emerging first from the injection nozzle form a jet duct which results in an accelerated penetration of the following jet parcels or part quantities due to a lee effect, so that, in the absence of a swirl movement of the combustion space, an impingement of fuel onto the cylinder wall becomes more likely.

In a refinement of the invention, the operating stroke of the nozzle needle is set in such a way that, within the injection nozzle, an effective flow cross section between the nozzle needle and a nozzle needle seat amounts to about 0.8 to 1.2 times an effective flow cross section of the sum of all the injection bores. A desired throttling action can thereby be achieved in a controlled way in the seat of the nozzle needle and gives rise to an unstable cavitating flow in the injection bores of the injection nozzle.

In a further refinement of the invention, the piston has a piston recess which is of dish-shaped design, a projection extending from the center of the piston recess in the direction of the injection nozzle. Owing to the dish-like basic shape, no narrow radii on the surface or cross-sectional jumps in the piston head occur in the piston recess, so that, when the internal combustion engine is in operation, if fuel droplets impinge onto the recess, these evaporate quickly.

According to a further refinement of the invention, the piston recess has, starting from the piston head, first, a flat entry with a low curvature and, from the region of the maximum recess depth, a greater curvature extending into the piston recess projection. This prevents an accretion of fuel in the region of the piston head and thus achieves a minimization of exhaust gas emissions. Preferably, the piston recess projection has a cone angle in a range of 90° to 160°.

Other objects, advantages, and novel features of the present invention will become apparent from the following detailed description of the invention when considered in conjunction with the accompanying drawings, for example.

DETAILED DESCRIPTION

Figure 1:
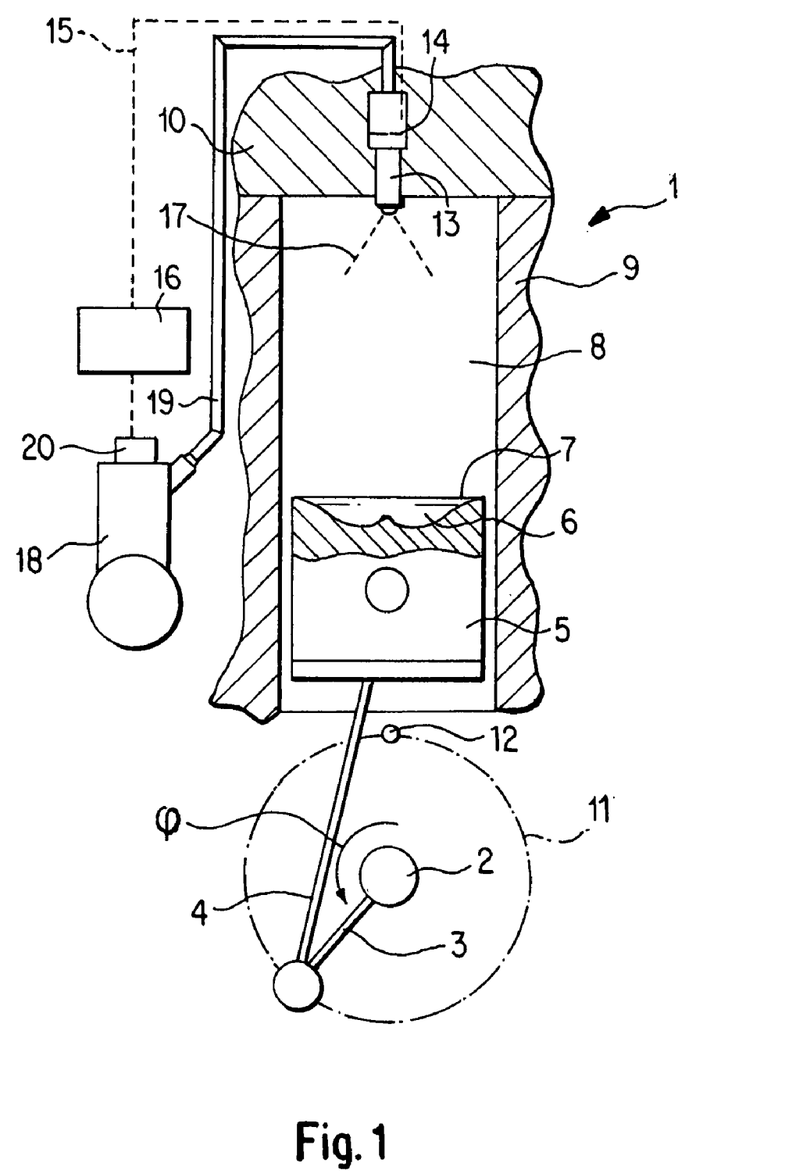
FIG. 1 shows a diagrammatic cross section through an internal combustion engine with compression ignition.

FIG. 1 shows an internal combustion engine 1, in which a crankshaft 2 is driven via a connecting rod 4 by a piston 5 guided in a cylinder 9. Between the piston 5 and a cylinder head 10, a combustion space 8, which comprises a piston recess 6 introduced into the piston head 7, is formed in the cylinder 9.

During the clockwise rotation of a crank 3 of the crankshaft 2 on a crank circle 11, the combustion space 8 is reduced in size, the air enclosed in it being compressed. The charge exchange in the combustion space 8 takes place via gas exchange valves and gas ducts, not illustrated, in the cylinder head 10.

When the crank 3 reaches a top dead center 12, designated below by TDC, the end of compression is reached. The current position of the piston 5 in relation to the cylinder head 10 is defined by the crank angle $\phi$ with respect to the top dead center 12.

An injection nozzle 13 having a plurality of injection bores 21 is arranged centrally in the cylinder head 10. The injection bores are in each case inclined at an angle of 30° to 80° with respect to the nozzle axis. The injection-hole cone angle amounts to approximately 60° to 160°, preferably 80° to 140°. It may, in principle, be a question of a conventional and therefore cost-effective hole nozzle of the seat-hole, mini-blindhole or blindhole type. The injection nozzle 13 is activated via a signal line 15 and an actuator 14, for example a piezoelectric actuator, by an electronic control unit 16, the engine control. The injection jets emerging from the injection nozzle are designated by 17.

The fuel is made available in a plurality of pressure stages by an injection pump 18, a control valve 20, expediently an electronically activatable solenoid valve, limiting the respective maximum pressure in the fuel line 19. Preferably, the injection pressure is adapted by a suitable injection system. In this case, an injection system controlled by needle stroke, with corresponding pressure modulation, may be used.

Figure 2:
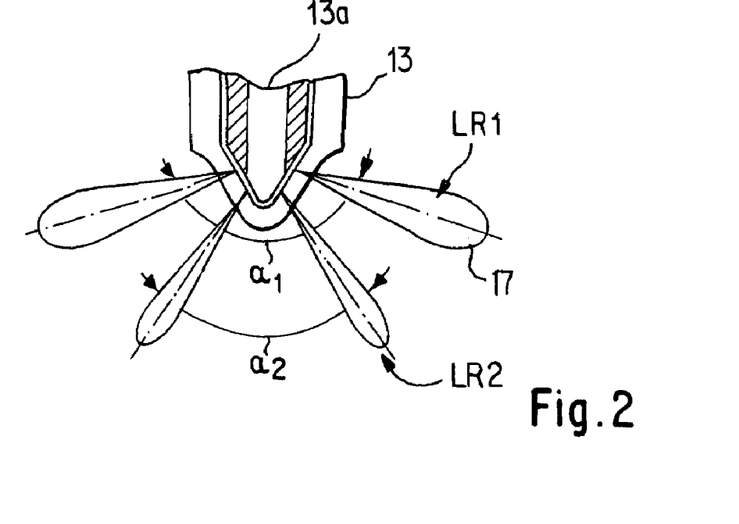
FIG. 2 shows a diagrammatic cross section through an injection nozzle with two differently activatable rows of holes having different injection-hole cone angles in accordance with an embodiment of the present invention.

According to the invention, the injection nozzle 13 has four to fourteen injection bores 21 which are arranged so as to be distributed over the circumference, preferably in one or two rows of holes. Preferably, the injection nozzle 13 is designed as an internally opening coaxial varionozzle which has two differently activatable rows of holes $L_{R1}$ and $L_{R2}$. Preferably, an injection nozzle is used, which is designed, with variably switchable rows of injection holes according to FIG. 2, as a coaxial varionozzle of the company Bosch, in conjunction with direct piezoelectric activation.

The first row of holes $L_{R1}$ preferably has an injection-hole cone angle $\alpha_1$ of between 140° and 180°. This serves for illustrating conventional lean-burn operation and is arranged above the second row of holes $L_{R2}$ according to FIG. 2. The second row of holes has a smaller injection-hole cone angle $\alpha_2$, preferably of between 60° and 140°. It serves, in particular, for the configuration of rich-mix combustion with postinjection and, if appropriate, preinjection. By the second row of holes $L_{R2}$ having the smaller injection cone angle $\alpha_2$ being activated, a free jet length is prolonged, for example in the case of late postinjection, for example at 70° CA to 90°

Figure 3:
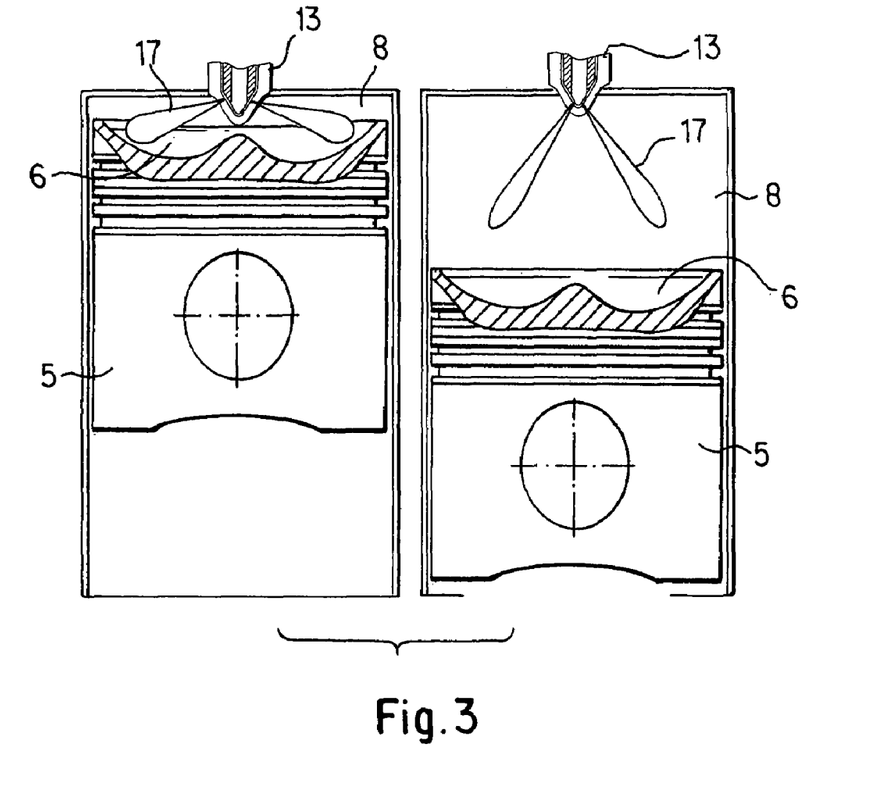
FIG. 3 shows a diagrammatic illustration of injected fuel jets through an injection nozzle according to FIG. 2.

CA after TDC according to FIG. 3, image on the right. The fuel jet 17 thus does not impinge onto the cylinder wall, but is directed in the direction of the piston recess 6 or toward the piston head 7.

Figure 8:
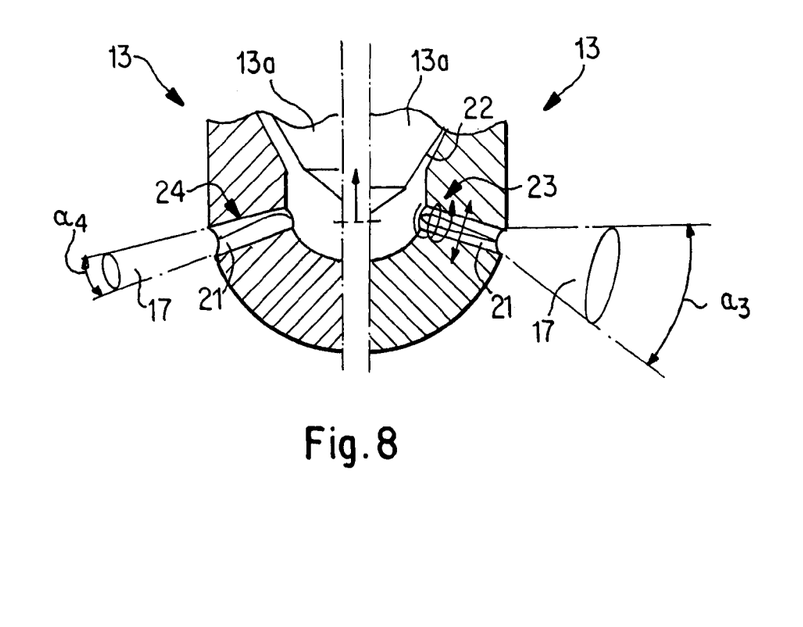
FIG. 8 shows a diagrammatic illustration of a throttling action in the nozzle hole of a multihole nozzle for the formation of an unstable cavitating flow in accordance with an embodiment of the present invention.

The injection nozzle 13 has a nozzle needle 13a, illustrated in FIG. 8, which is connected to a control element, not illustrated. By the nozzle needle 13a being activated by the control element, it is moved, in order to open or to close the injection nozzle 13. In this case, in an operating position, a defined operating stroke h is set as a function of the operating point and/or as a function of the crank angle φ. A fuel throughflow can then be determined or varied as a function of the operating stroke h and of an opening time or cycle duration and also of the set fuel injection pressure.

Figure 4:
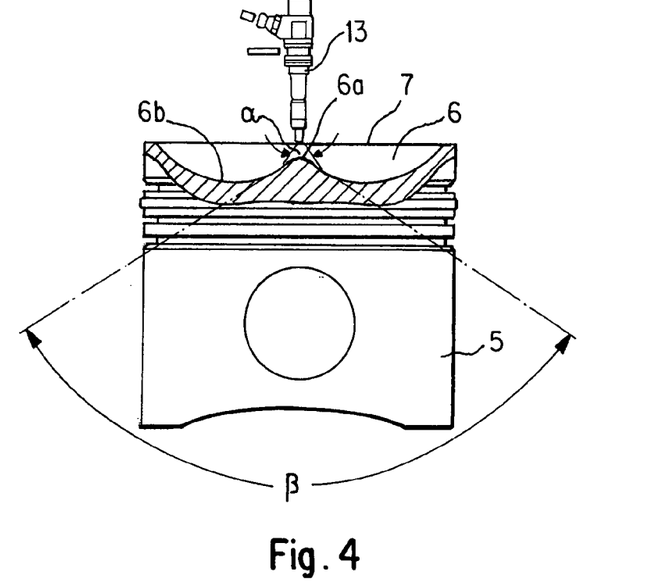
FIG. 4 shows a diagrammatic arrangement of the injection nozzle according to FIG. 2 above a piston recess of the internal combustion engine according to FIG. 1.

According to FIG. 4, the injection nozzle 13 is arranged above a piston recess 6 which is introduced in the piston head 7 and which is arranged centrally in the combustion space 8 of the internal combustion engine 1. The piston recess 6 is of dish-shaped configuration, a projection being located, as a piston recess tip 6a, in the center of the piston recess 6. The piston recess tip 6a is bordered by a recess bottom 6b, the recess tip 6a projecting in the direction of the injection nozzle 13. The dish-shaped design of the piston recess 6 ensures that, in conventional lean-burn operation with main injection around top dead center TDC according to FIG. 3, image on the left, no over-enrichment of the mixture in the piston recess occurs.

Figure 5:
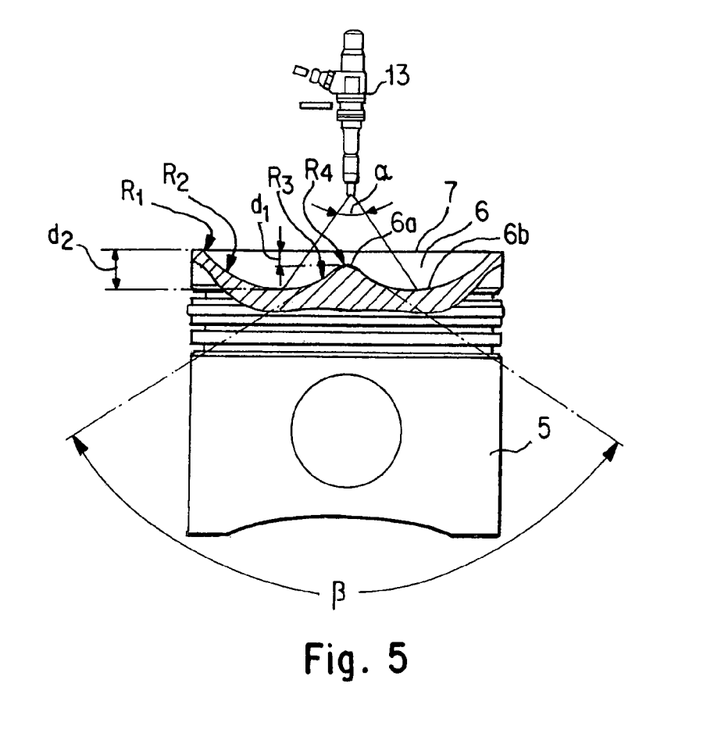
FIG. 5 shows a diagrammatic illustration of a cross-sectional view of the piston recess according to FIG. 4.

According to FIG. 5, the piston recess 6 has at the edge, as a transition to the piston head 7, a radius R1 which preferably amounts to between three and seven mm. The outer regions of the recess bottom 6b are designed with a spherical radius R2 of between 40 mm and 50 mm. The transition from the piston recess tip 6a to the piston recess bottom 6b has a curvature with a radius R3 of about 16 to 24 mm. The piston recess tip 6a is located approximately opposite the injection nozzle 13. The depth of the piston recess 6 increases from the edge of the piston recess 6 toward the piston recess bottom 6b. The piston recess tip 6a extends, opposite the injection nozzle 13, in such a way that it remains arranged approximately below the piston head 7. The distance d1 between the upper point of the piston recess tip 6a and the piston head amounts to about 3 mm to 10 mm, and d1 may preferably be designed to be between 5 mm and 8 mm. The recess bottom depth d2 amounts to about 15 mm to 20 mm. The dish-like basic recess shape has a rounded transition to the piston head in the edge region of the piston recess 6, in order to avoid accumulations of fuel.

The piston recess tip 6a is designed in a cone-like manner with a recess cone angle β in the range of 90° to 130° and is formed with a rounded tip having a radius R4 of about 3 to 7 mm. The fuel cone angle α and the position of the piston recess tip 6a cooperate in such a way that the propagation of the fuel jets is not disturbed by the piston recess tip 6a. This ensures that the fuel jets impinge in the region of the piston recess 6 approximately in each piston position in the cylinder.

During the main injection, the piston recess shape has a highly advantageous effect, so that, for the heterogeneous combustion phase, thermal NO formation is markedly reduced, since the oxygen concentration due to a preceding homogeneous combustion fraction is reduced as a result of preinjection. In the event of late fuel postinjection, for example 80° CA after TDC, the fuel is introduced through the lower row of holes LR2 into the combustion space 8 at a steep injection angle of 60° to 140°, with the result that the free jet length is prolonged according to FIG. 5 and FIG. 3, image on the right.

When preinjection and postinjection are carried out intermittently, the combustion space configuration according to the invention, that is to say the design of the injection nozzle 13 and the piston recess shape and its arrangement in the combustion space 8, have a very positive effect in preventing a wetting of the combustion space walls with fuel, since the injection nozzle 13 is arranged in the region of a cylinder center axis in the cylinder head 10 and the piston recess 6 located in the piston head 7 is arranged opposite.

According to the invention, the formation of a swirl movement in the combustion space 8 is provided as a further measure for reducing the wetting of the combustion space walls with fuel, this measure having a positive effect on the operation of the internal combustion engine, particularly during intermittent fuel injection in the case of the present combustion space configuration. If there is no swirl in the combustion space 8, the injected fuel part quantities of a fuel jet then follow a corresponding profile according to FIG. 6, image on the right, which illustrates diagrammatically a sector of the combustion space 8 in which an intermittent injection jet from an injection bore is propagated along an injection-hole or jet center axis 25 in the direction of the cylinder wall. FIG. 7 illustrates a cycle in which, for example, three fuel part quantities $T_1$, $T_2$ and $T_3$ are injected into the combustion space. According to the invention, the cycling may be carried out as twofold to eightfold cycling.

Figure 6:
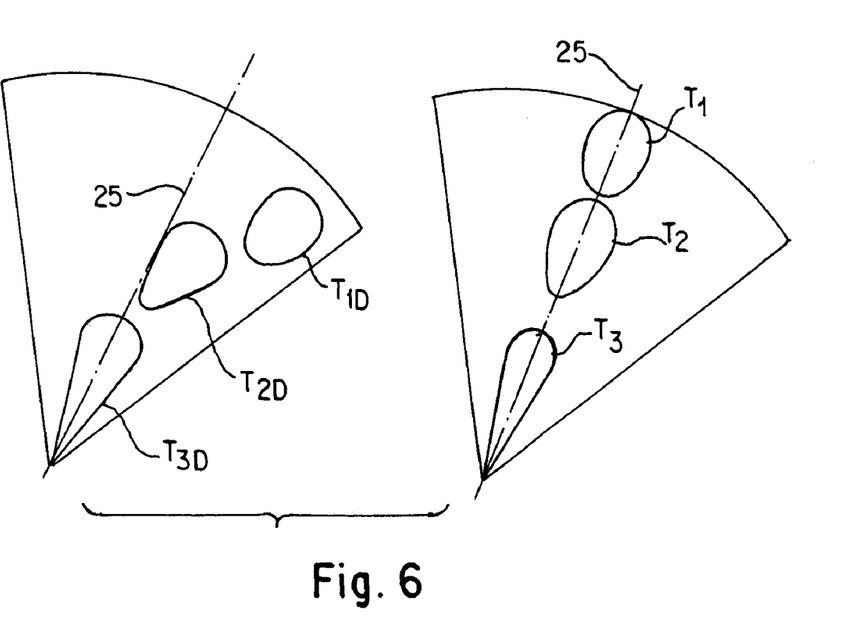
FIG. 6 shows a diagrammatic illustration of intermittent injection jets with and without swirl in accordance with an embodiment of the present invention.
Figure 7:
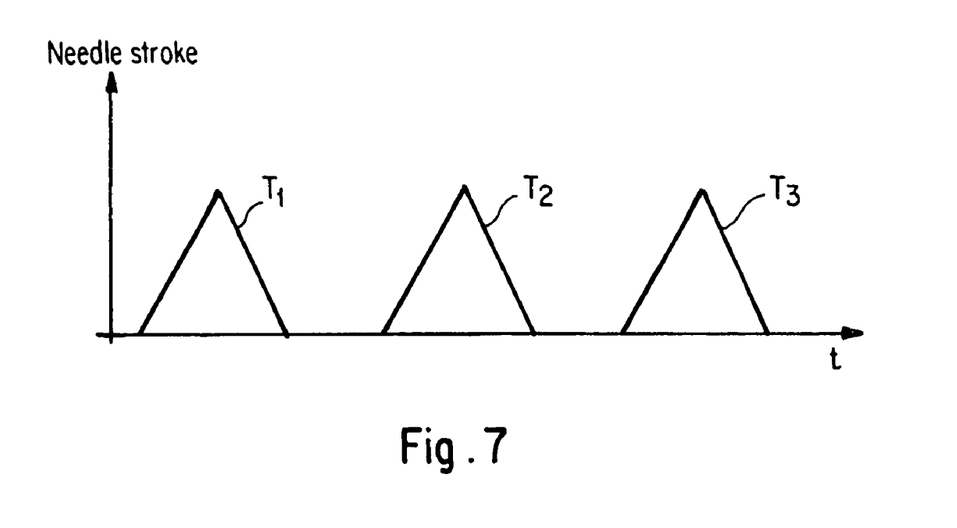
FIG. 7 shows a graph of the profile of the intermittent fuel injection according to FIG. 6.

According to FIG. 6, image on the left, in the case of intermittent injection, the trajectory of the individual fuel part quantities $T_{1D}$, $T_{2D}$ and $T_{3D}$ is deflected markedly from the jet center axis 25 when the charge movement in the combustion space 8 has a swirl. By contrast, according to FIG. 6, image on the right, the fuel part quantities impinge onto the combustion space wall on account of the shorter travel to the cylinder wall. If there is a swirl movement in the combustion space 8, then the free jet length up to the cylinder wall is prolonged, as compared with the profile of the trajectory of the individual fuel part quantities $T_1$, $T_2$ and $T_3$ in the image on the right. A wall accretion of fuel can thereby largely be avoided.

Accordingly, it is expedient, in addition, to generate a switchable variable swirl in the combustion space 8 of the internal combustion engine 1, so that a mixture cloud of an injection part quantity, particularly in the case of preinjection and/or postinjection, is assisted by an adapted swirl movement of the charge in the combustion space, and, at the same time, the jet penetration depth is reduced. The jet lobe or the mixture cloud of an injection cycle is therefore rotated as a result of the swirl flow to an extent such that, during a following injection cycle, the newly formed jet lobes do not penetrate into the mixture cloud of the preceding injection part quantity. Local overenrichments and the jet penetration depths are thereby reduced, with the result that fewer soot particles are formed.

FIG. 8 gives a diagrammatic illustration of the injection nozzle 13 of the blindhole nozzle type, although a nozzle of the seat-hole nozzle type may be used. In the injection nozzle 13 according to FIG. 6, the action of an unstable cavitating flow caused in a nozzle hole 21 of the injection nozzle 13 in the case of a low needle stroke h of the nozzle needle 13a, that is to say with the injection nozzle 13 partially open, and the effect, thereby achieved, on a propagation angle $\alpha_3$ of the injection jet 17 are illustrated.

On the right side in FIG. 8, the injection nozzle 13 is only partially open, with the result that throttling in the nozzle needle seat 22 is achieved. This throttling gives rise, in the nozzle hole 21, to a turbulent or unstable cavitating flow which leads to a high propagation angle $\alpha_3$ of the fuel jet 17.

In comparison with a fully open injection nozzle with a maximum stroke setting, as illustrated on the left side of FIG. 8, the propagation angle $\alpha_3$ caused by the unstable cavitating flow is higher than a propagation angle $\alpha_4$ which is brought about without such a flow. The unstable cavitating flow gives rise to pronounced fluctuations in the internal nozzle flow 23, which, when fuel emerges from the nozzle hole 21, lead to an increased fuel jet breakdown and therefore to a high propagation angle $\alpha_3$.

The fuel jet having the propagation angle $\alpha_3$ is propagated in the combustion space with intensive atomization and thus brings about better homogenization and rapid fuel evaporation, so that more fuel can be injected in a part quantity for preinjection or postinjection, without any appreciable wetting of the combustion space wall. By contrast, in the case of the injection nozzle 13 having the maximum stroke setting according to the left side in FIG. 8, a two-phase flow 24 is generated inside the nozzle hole 21 on the left side and leads to a conventional fuel breakdown. As compared with a partially open injection nozzle, the propagation angle $\alpha_4$ is lower than the propagation angle $\alpha_3$.

A controlled setting of a desired throttling action in the seat of the nozzle needle can be assisted by means of a suitable structural measure, for example using a two-spring holder on the injection nozzle, the dwelling of the nozzle needle in an operating stroke position lying between the fully closed and fully open position being implemented. Alternatively, this setting may be implemented via a nozzle needle controlled directly by means of a piezoelectric actuator. By a throttling action being achieved in the injection nozzle seat by means of the setting of the operating stroke h and the activation of the rows of holes as a function of the operating point and/or of the piston position, a limitation or variation of the range of the injected fuel jets 17 is achieved.

In order to achieve as high a propagation angle $\alpha 3$ as possible in the case of a partially open multihole injection nozzle, activation should preferably take place in such a way that the effective flow cross section in the needle seat preferably amounts to about 0.8 to 1.2 times an effective flow cross section of the sum of all the cross sections of the injection bores.

Figure 9:
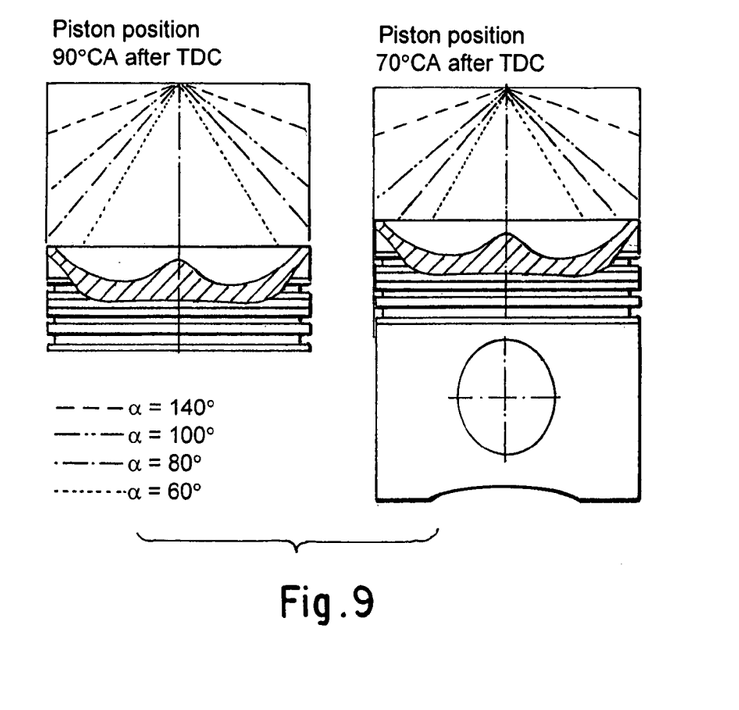
FIG. 9 shows a diagrammatic illustration of a fuel injection into the combustion space of the internal combustion engine according to FIG. 1 with different injection-hole cone angles.

FIG. 9 illustrates the effect of a selection of lower injection-hole cone angles, for example 60° instead of 140°. As a result, in the event of late postinjection, for example 70° CA to 90° CA after TDC, the free jet length is prolonged. The fuel jet is then not directed toward the cylinder wall, but toward the piston surface or in the direction of the piston recess.

Further measures for optimizing the mixture formation when the internal combustion engine 1 is in operation can be implemented by varying an executed cycling as a function of the operating point and/or by varying the fuel injection pressure. For example, main injection is carried out, in a range of between 10° CA before TDC to 40° CA after TDC, at a higher injection pressure than during preinjection and postinjection. In this case, a greater needle stroke h is set during main injection than during preinjection. The injection of an additional fuel quantity in the form of postinjection can be carried out, particularly during a rich-mix phase, by means of twofold to eightfold cycled injection in the expansion stroke over an interval of approximately 20° to 150° CA after TDC. The individual injection cycles for injection are adapted in terms of duration, injection pressure, needle stoke profile and the interaction with the internal cylinder flow, in such a way that the best possible mixture distribution is achieved. An application of fuel to the cylinder wall is thus largely prevented.

The needle stoke setting is carried out differently during postinjection, in which case it is preferably subsequently set lower. In this case, during postinjection, and in the case of a variable needle stroke, a constant fuel injection pressure is set, which is preferably higher than that during preinjection and lower than that during main injection. Preferably, the cycling during postinjection is carried out in such a way that the first fuel part quantity of postinjection is greater than the following fuel part quantity.

It is expedient that different fuel pressure change rates are set during preinjection and postinjection, since different combustion reactions take place in the combustion space 8 both during preinjection and during postinjection and give rise to unequal combustion space pressure profiles or temperature profiles. For example, a combined homogeneous/heterogeneous operation of the internal combustion engine with fourfold cycled preinjection and a rising cycle duration, along with a constant injection pressure, is carried out, during which the nozzle needle 13a dwells in a lower stroke position. Main injection then takes place at an increased injection pressure and with a maximum set needle stroke h. Postinjection with a decreasing cycle duration, along with a constant injection pressure, is subsequently carried out. Preferably, cycling during postinjection is carried out in such a way that the first fuel part quantity of postinjection is greater than the following fuel part quantity.

Preferably, the overall injection quantity of preinjection preferably amounts, particularly in the case of the above-mentioned injection strategies, in the lower part load range, that is to say up to a 70% load, to about 20% to 50% of the main injection quantity and, in the upper load range, that is to say from a 70% load to full load, to about 10% to 30% of the main injection quantity. It is in this case selected such that knocking combustion is reliably avoided. This homogenized fuel fraction then burns, approximately free of soot and of NOx, but already generates a considerable fraction of the CO emission required for NOx reduction at the NOx storage catalytic converter and delivers an important fraction for reducing the air ratio.

By virtue of the combustion space configuration according to the invention, in conjunction with the injection nozzle according to the invention, increased homogenization is achieved in the case of early or late introduction of fuel, so that an application of fuel to the cylinder wall can be prevented. At the same time, the combustion space shape provided has a highly advantageous effect on heterogeneous mixture formation during main injection. Combined homogeneous/heterogeneous operation within a work cycle can thereby be organized by means of a conventional multihole nozzle.

The present internal combustion engine 1 is suitable particularly for a combined homogeneous/heterogeneous combustion method with compression ignition, so that conventional lean-burn combustion, known from diesel engines, and rich-mix combustion for optimizing a following exhaust gas treatment system, designed particularly for internal combustion engines operated with lean burn, can be carried out. The internal combustion engine 1 is normally operated largely with lean burn and, if required, for optimizing the following exhaust gas purification system, with a rich mix. Both in the lean-burn operation and in the rich-mix operation of the internal combustion engine 1, the fuel quantity to be introduced can be introduced into the combustion space by being divided up as a preinjection, a main injection and a postinjection quantity as a function of the operating point.

When the internal combustion engine 1 is in operation, measures are taken to avoid the accretion of liquid fuel in conjunction with postinjection provided after main injection or with preinjection provided before main injection, so that an early intermixing with the combustion air contained in the combustion space takes place. These measures may be carried out individually or in combination with one another, so that any conceivable combination of these measures may be selected, as required.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine, comprising
   a control unit;
   a combustion space formed between a piston and a cylinder head; and
   a fuel injection device with an injection nozzle, which has a nozzle needle and a plurality of injection bores, wherein
      the injection nozzle is arranged to inject fuel into the combustion space in the form of a plurality of fuel jets as at least one of a main injection, pre-injection and post-injection,
      the nozzle needle is arranged to permit fuel injection selectively through at least two separate groups of said injection bores,
      the control unit is programmed to control an operating stroke of the nozzle needle as a function of at least one of a piston position and an operating point of the internal combustion engine, and
      the operating stroke of the nozzle needle is controlled by the control unit to form an unstable cavitating flow in the injection bores.

2. The internal combustion engine as claimed in claim 1, wherein
   each of the at least two separate groups of bores are arranged in the rows about a circumference of the injection nozzle, and
   at least one row of bores has a fuel injection cone angle which is different from a fuel injection cone angle of a different row of bores.

3. The internal combustion engine as claimed in claim 2, wherein
   a first row of bores is activated during main injection and a second row of holes is activated during at least in of pre-injection and post-injection, and
   the first row fuel injection cone angle is greater than the second row fuel injection cone angle.

4. The internal combustion engine as claimed in claim 1, wherein a fuel injection pressure is set as a function of at least one of the piston position and the operating point.

5. The internal combustion engine as claimed in claim 1, wherein the engine is configured to produce a gas swirl movement in the combustion space.

6. The internal combustion engine as claimed in claim 5, wherein the nozzle needle is controlled to inject fuel in one of a continuous or an intermittent manner while the gas swirl movement is present in the combustion space, such that the injected fuel is laterally displaced relative to the fuel injection device by the swirl movement.

7. The internal combustion engine as claimed in claim 1, wherein the operating stroke of the nozzle needle of the injection nozzle needle is controlled to provide an effective flow cross section between the nozzle needle and a nozzle needle seat amounting to about 0.8 to 1.2 times an effective flow cross section of the sum of all the injection bores.

8. The internal combustion engine as claimed in claim 1, wherein the fuel injection cone angle of each injection bore is between 60° and 160°.

9. The internal combustion engine as claimed in claim 1, wherein the operating stroke of the nozzle needle is set by one of a two-spring holder and a piezoelectric actuator.

10. The internal combustion engine as claimed in claim 1, wherein the piston has a dish-shaped piston recess and a projection extending from a center of the piston recess toward the injection nozzle.

11. The internal combustion engine as claimed in claim 10, wherein the piston recess has, starting from a radially outer region, a flat entry region with a low curvature and, from the region of a maximum recess depth, a greater curvature extending into the piston recess projection.

12. The internal combustion engine as claimed in claim 10, wherein the piston recess projection has a cone angle in a range of 90° to 140°.

* * * * *